(12) United States Patent
Miyagawa

(10) Patent No.: US 11,223,773 B1
(45) Date of Patent: Jan. 11, 2022

(54) WIFI CAMERA WITH ANIMATED LCD SCREEN

(71) Applicant: NSK CO., LTD., Nagoya (JP)

(72) Inventor: Yoshiki Miyagawa, Nagoya (JP)

(73) Assignee: NSK CO., LTD., Nagoya (JP)

( * ) Notice: Subject to any disclaimer, the term of this patent is extended or adjusted under 35 U.S.C. 154(b) by 0 days.

(21) Appl. No.: 17/391,066

(22) Filed: Aug. 2, 2021

(30) Foreign Application Priority Data

Jul. 1, 2021 (CN) .......................... 202121509805.0

(51) Int. Cl.
*H04N 5/225* (2006.01)
*H04N 5/232* (2006.01)
*G01D 21/02* (2006.01)

(52) U.S. Cl.
CPC ....... *H04N 5/232935* (2018.08); *G01D 21/02* (2013.01)

(58) Field of Classification Search
CPC ............... H04N 5/2251–2253; H04N 5/23206
USPC ........................ 348/211.99, 211.02, 373, 374
See application file for complete search history.

(56) References Cited

U.S. PATENT DOCUMENTS

| 2018/0007331 A1* | 1/2018 | Levcovich ........ G08B 13/19617 |
| 2018/0020193 A1* | 1/2018 | Blum ........................ G06F 3/16 |
| 2018/0249054 A1* | 8/2018 | Chien .................. H04N 5/2257 |

\* cited by examiner

*Primary Examiner* — Anthony J Daniels

(57) ABSTRACT

A WIFI camera with an animated liquid crystal display (LCD) screen includes a camera body, an induction display mechanism connected to the camera body, and a temperature and humidity detecting mechanism connected to the camera body. The induction display mechanism is configured to display a working state of the camera body. The temperature and humidity detecting mechanism is configured to monitor external temperature and humidity.

4 Claims, 1 Drawing Sheet

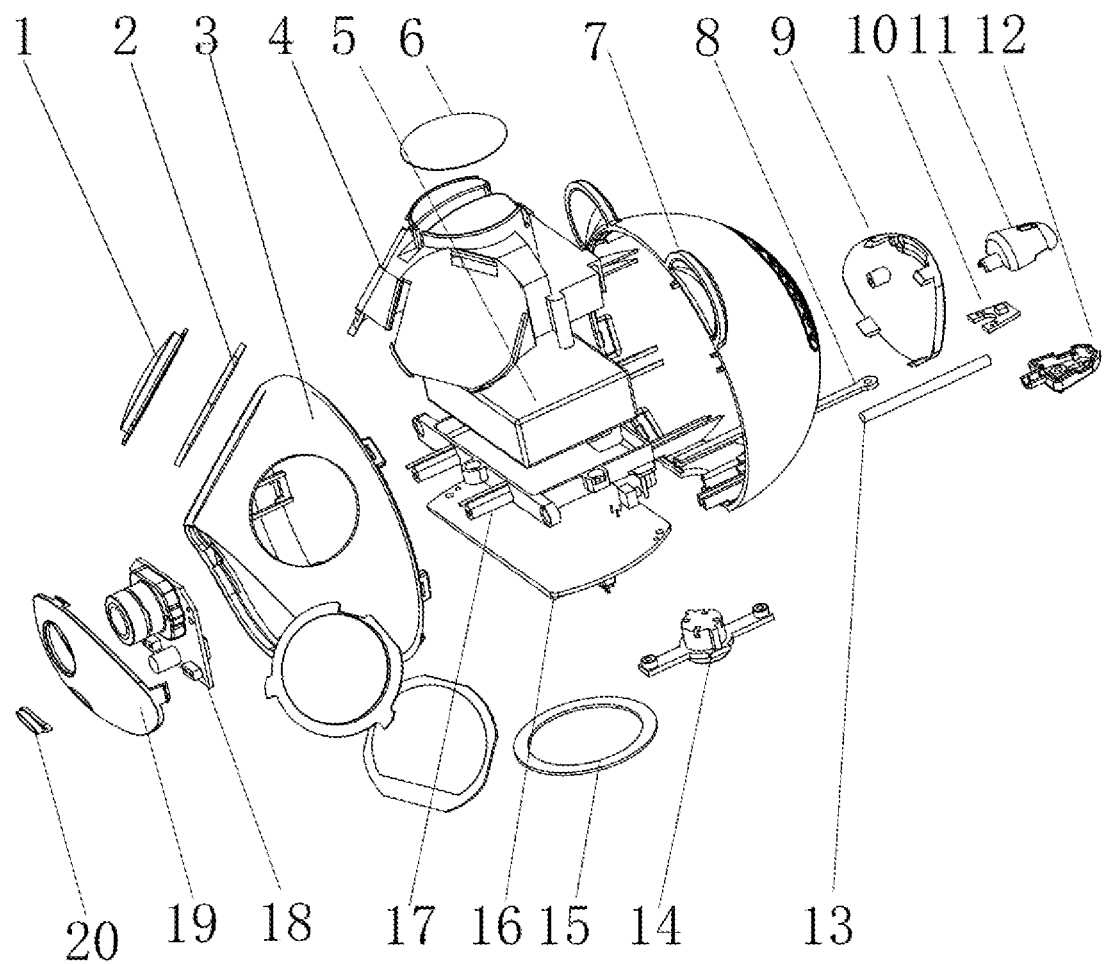

WIFI CAMERA WITH ANIMATED LCD SCREEN

TECHNICAL FIELD

The present disclosure relates to a field of camera technology, and in particular to a WIFI camera with an animated LCD screen.

BACKGROUND

A video camera is a device that uses optical principles to record images. The video camera is configured for film and television programs in the first time, but is popular and widely used now. As with cameras, the video camera needs to use a negative (i.e., a tape) in the early days. However, with the invention of digital cameras, images and videos can be stored directly in flash memory. Moreover, an updated camera is able to store image and video data directly in a cloud space. Further, this type of camera can not only dynamically records videos, but also takes static shootings.

Conventional WIFI cameras do not have an additional display screen to show that the camera is in a different state. In order to solve above technical problems, it is necessary to provide a WIFI camera with an animated LCD screen to solve defects in the prior art.

SUMMARY

An object of the present disclosure is to provide a WIFI camera with an animated LCD screen to solve a problem that conventional WIFI cameras do not have an additional display screen to show that the camera is in a different state.

To achieve the above object, the present disclosure provides a WIFI camera with an animated liquid crystal display (LCD) screen. The WIFI camera with the animated LCD screen includes a camera body, an induction display mechanism connected to the camera body, and a temperature and humidity detecting mechanism connected to the camera body. The induction display mechanism is configured to display a working state of the camera body. The temperature and humidity detecting mechanism is configured to monitor external temperature and humidity.

Furthermore, the camera body comprises a camera mainboard. Two sides of the camera mainboard are fixedly connected with a front shell and a rear shell separately. A power supply is arranged on one side of the camera mainboard; a bracket lower cover is connected between the power supply and the camera mainboard. A bracket upper cover is fixedly connected to one side of the power supply opposite to the bracket lower cover. The bracket upper cover is configured to fix the induction display mechanism.

Furthermore, the induction display mechanism comprises a display screen. The display screen is fixedly connected with the bracket upper cover. A side end surface of the display screen is fixedly connected to a lens. A camera lens plate is arranged in the front shell; a night-visual lampshade is arranged on a side end surface of the front shell facing the camera lens plate. A side end surface of the night-visual lampshade is fixedly connected to a photosensitive cover. A touch copper sheet is fixedly connected with a side of the bracket upper cover.

Furthermore, the temperature and humidity detecting mechanism comprises a rear cover. A silicone connecting piece is connected between the rear cover and the rear shell. A side end surface of the rear cover is fixedly connected to a temperature and humidity plate. Two sides of the temperature and humidity plate are respectively fixedly connected to a temperature and humidity sensor upper cover and a temperature and humidity sensor lower cover. A data transmission cable is connected between the camera mainboard and the temperature and humidity plate.

Furthermore, a side end surface of the camera mainboard is fixedly connected with a nut fixing ring. A rubber gasket is connected between the camera mainboard and the nut fixing ring.

Compared with the prior art, the WIFI camera with the animated LCD screen of the present disclosure displays the working state of the camera body by the induction display mechanism to facilitate user use, while monitoring the external temperature and humidity by the temperature and humidity detecting mechanism.

BRIEF DESCRIPTION OF DRAWINGS

FIG. 1 is a schematic diagram showing a structure of a WIFI camera with an animated LCD screen of the present disclosure.

In the drawings:
1—lens; 2—display screen; 3—front shell; 4—bracket upper cover; 5—rechargeable battery; 6—touch copper sheet; 7—rear shell; 8—silicone connecting piece; 9—rear cover; 10—temperature and humidity plate; 11—temperature and humidity sensor upper cover; 12—temperature and humidity sensor lower cover; 13—data transmission cable; 14—nut fixing ring; 15—rubber gasket; 16—camera mainboard; 17—bracket lower cover; 18—camera lens plate; 19—night-visual lampshade; and 20—photosensitive cover.

DETAILED DESCRIPTION

In order to make purposes, technical solutions, and advantages of the present disclosure clear, the present disclosure will be described in further detail below with reference to the accompanying drawings and embodiments. It should be understood that the specific embodiments described herein are used to explain the present disclosure and is not intended to limit the present disclosure.

Specific implementation of the present disclosure will be described in detail below with reference to the specific embodiments.

As shown in FIG. 1, the present disclosure provides a WIFI camera with an animated liquid crystal display (LCD) screen. The WIFI camera with the animated LCD screen includes a camera body, an induction display mechanism connected to the camera body, and a temperature and humidity detecting mechanism connected to the camera body. The induction display mechanism is configured to display a working state of the camera body. The temperature and humidity detecting mechanism is configured to monitor external temperature and humidity.

The WIFI camera with the animated LCD screen displays the working state of the camera body by the induction display mechanism to facilitate user use, while monitoring the external temperature and humidity by the temperature and humidity detecting mechanism.

In one optional embodiment, the camera body comprises a camera mainboard 16. Two sides of the camera mainboard 16 are fixedly connected with a front shell 3 and a rear shell 7 separately. A rechargeable battery 5 is arranged on one side of the camera mainboard 16. A bracket lower cover 17 is connected between the rechargeable battery 5 and the camera mainboard 16. A bracket upper cover 4 is fixedly connected to one side of the rechargeable battery 5 opposite to the bracket lower cover 17. The bracket upper cover 17 is configured to fix the induction display mechanism. The camera mainboard 16 is protected by the front shell 3 and the rear shell 7. The rechargeable battery 5 provides electrical energy for the entire WIFI camera without external power.

In one optional embodiment, the induction display mechanism comprises a display screen 2. The display screen 2 is fixedly connected with the bracket upper cover 4. A side end surface of the display screen 2 is fixedly connected to a lens 1. A camera lens plate 18 is arranged in the front shell 3 A night-visual lampshade 19 is arranged on a side end surface of the front shell 3 facing the camera lens plate 18. A side end surface of the night-visual lampshade 19 is fixedly connected to a photosensitive cover 20. A touch copper sheet 6 is fixedly connected with a side of the bracket upper cover 4. In the embodiment, the display screen 2 is a screen with a size of 1.25 inches. A pressure signal is received by the touch copper sheet 6, therefore the WIFI camera responses to a user's instructions. The camera lens plate 18 records images and videos. The 1.25 inches display screen 2 is protected by the lens 1. Further, an imaging clarity of the camera lens plate 18 in dim light is improved by the photosensitive cover 20 and the night-visual lampshade 19.

In one optional embodiment, the temperature and humidity detecting mechanism comprises a rear cover 9. A silicone connecting piece 8 is connected between the rear cover 9 and the rear shell 7. A side end surface of the rear cover 9 is fixedly connected to a temperature and humidity plate 10. Two sides of the temperature and humidity plate 10 are respectively fixedly connected to a temperature and humidity sensor upper cover 11 and a temperature and humidity sensor lower cover 12. A data transmission cable 13 is connected between the camera mainboard 16 and the temperature and humidity plate 10. The temperature and humidity plate 10 records temperature and humidity variation of an outside. The temperature and humidity plate 10 transmits temperature and humidity data to the camera mainboard 16 through the data transmission cable 13.

In one optional embodiment, a side end surface of the camera mainboard 16 is fixedly connected with a nut fixing ring 14. A rubber gasket 15 is connected between the camera mainboard 16 and the nut fixing ring 14. The WIFI camera is effectively fixed with a connecting bracket of an external device by the nut fixing ring 14.

The above embodiments are only optional embodiments of the present disclosure and are not intended to limit the present disclosure. Any modifications, equivalents, and improvements made within the spirit and principles of the present disclosure should be included in the protection scope of the present disclosure.

In addition, it should be understood that in order to simplify the present disclosure, the specification describes multiple embodiments, and it does not mean that each embodiment contains only a separate technical solution. Those skilled in the art should regard the specification as a whole. The technical solutions in each embodiment may also be appropriately combined to form other embodiments, which is understood by those skilled in the art.

What is claimed is:

1. A WIFI camera with an animated liquid crystal display (LCD) screen, comprising:
    a camera body;
    an induction display mechanism connected to the camera body; and
    a temperature and humidity detecting mechanism connected to the camera body;
    wherein the induction display mechanism is configured to display a working state of the camera body; the temperature and humidity detecting mechanism is configured to monitor external temperature and humidity;
    wherein the camera body comprises a camera mainboard; two sides of the camera mainboard are fixedly connected with a front shell and a rear shell separately; a power supply is arranged on one side of the camera mainboard; a bracket lower cover is connected between the power supply and the camera mainboard; a bracket upper cover is fixedly connected to one side of the power supply opposite to the bracket lower cover; the bracket upper cover is configured to fix the induction display mechanism.

2. The WIFI camera with the animated LCD screen according to claim 1, wherein the induction display mechanism comprises a display screen; the display screen is fixedly connected with the bracket upper cover; a side end surface of the display screen is fixedly connected to a lens; a camera lens plate is arranged in the front shell; a night-visual lampshade is arranged on a side end surface of the front shell facing the camera lens plate; a side end surface of the night-visual lampshade is fixedly connected to a photosensitive cover; a touch copper sheet is fixedly connected with a side of the bracket upper cover.

3. The WIFI camera with the animated LCD screen according to claim 1, wherein the temperature and humidity detecting mechanism comprises a rear cover; a silicone connecting piece is connected between the rear cover and the rear shell; a side end surface of the rear cover is fixedly connected to a temperature and humidity plate; two sides of the temperature and humidity plate are respectively fixedly connected to a temperature and humidity sensor upper cover and a temperature and humidity sensor lower cover; a data transmission cable is connected between the camera mainboard and the temperature and humidity plate.

4. The WIFI camera with the animated LCD screen according to claim 1, wherein a side end surface of the camera mainboard is fixedly connected with a nut fixing ring; a rubber gasket is connected between the camera mainboard and the nut fixing ring.

* * * * *